(12) United States Patent
Oh et al.

(10) Patent No.: US 10,681,627 B2
(45) Date of Patent: Jun. 9, 2020

(54) SYSTEM, METHOD AND PROGRAM FOR P2P FILE TRANSFER

(71) Applicant: ESTMOB INC., Seoul (KR)

(72) Inventors: Yoonsik Oh, Seoul (KR); Haeil Park, Seoul (KR)

(73) Assignee: ESTMOB INC., Seoul (KR)

( * ) Notice: Subject to any disclaimer, the term of this patent is extended or adjusted under 35 U.S.C. 154(b) by 94 days.

(21) Appl. No.: 15/926,348

(22) Filed: Mar. 20, 2018

(65) Prior Publication Data

US 2018/0213473 A1 Jul. 26, 2018

Related U.S. Application Data

(63) Continuation of application No. PCT/KR2015/009961, filed on Sep. 22, 2015.

(51) Int. Cl.
*H04W 48/20* (2009.01)
*H04W 48/16* (2009.01)
(Continued)

(52) U.S. Cl.
CPC ............. *H04W 48/20* (2013.01); *H04L 67/06* (2013.01); *H04W 28/02* (2013.01); *H04W 48/08* (2013.01); *H04W 48/16* (2013.01); *H04W 76/14* (2018.02); *H04W 76/20* (2018.02); *H04L 45/28* (2013.01); *H04W 40/24* (2013.01); *H04W 84/12* (2013.01); *H04W 92/20* (2013.01)

(58) Field of Classification Search
None
See application file for complete search history.

(56) References Cited

U.S. PATENT DOCUMENTS

2006/0199586 A1* 9/2006 Yoon ............... H04W 36/12 455/437
2015/0085844 A1* 3/2015 Tian ................ H04W 48/16 370/338

(Continued)

FOREIGN PATENT DOCUMENTS

KR 10-2006-0097338 A 9/2006
KR 10-2011-0080947 A 7/2011

OTHER PUBLICATIONS

International Search Report; issued in PCT/KR2015/009961; dated Jun. 22, 2016.

*Primary Examiner* — Kodzovi Acolatse
*Assistant Examiner* — The Hy Nguyen
(74) *Attorney, Agent, or Firm* — Studebaker & Brackett PC (57) ABSTRACT

The present disclosure relates to a program, a method and a system for P2P transmission. A method for P2P transmission by means of an access point, according to an embodiment of the present disclosure, includes at least: a step for receiving identification information of a detected access point from a transmission client and a reception client; a step for, if the reception client detects a first access point as the same detected access point or accesses the first access point which is the same detected access point, configuring the first access point as a transmission path; a step for checking whether or not the first access point has been configured to be blocked; and a step for matching first identification information with whether or not the first access point has been configured to be blocked and storing same in an accumulation database.

10 Claims, 2 Drawing Sheets

(51) Int. Cl.
*H04W 28/02* (2009.01)
*H04W 76/20* (2018.01)
*H04W 76/14* (2018.01)
*H04L 29/08* (2006.01)
*H04W 48/08* (2009.01)
*H04W 40/24* (2009.01)
*H04L 12/703* (2013.01)
*H04W 84/12* (2009.01)
*H04W 92/20* (2009.01)

(56) References Cited

U.S. PATENT DOCUMENTS

| | | | |
|---|---|---|---|
| 2015/0172923 A1* | 6/2015 | Osaki | H04W 12/06 |
| | | | 726/7 |
| 2017/0026980 A1* | 1/2017 | Krishna | H04W 72/10 |
| 2017/0034776 A1* | 2/2017 | Hou | H04W 12/08 |
| 2017/0048789 A1* | 2/2017 | Tan | H04B 17/318 |

* cited by examiner

SYSTEM, METHOD AND PROGRAM FOR P2P FILE TRANSFER

CROSS-REFERENCE TO RELATED APPLICATIONS

The present application is a continuation of International Patent Application No. PCT/KR2015/009961, filed on Sep. 22, 2015. The disclosure of the above-listed application is hereby incorporated by reference herein in its entirety.

BACKGROUND

The inventive concept described herein relates to a system, a method, and a program for peer-to-peer (P2P) file transfer, and more particularly, relates to a system, a method, and a program for accumulating information about an access point inhibited from being used as a relay node of the P2P transfer and avoiding a file transfer between clients through the inhibited access point.

A cloud manner in which a transmission terminal uploads a file to a server and a reception terminal downloads the file from the server may be used to transfer data between terminals. According to the cloud manner, upload and download speeds may vary with network conditions and locations of the transmitter terminal and the receiver terminal, the security may be vulnerable, and a lot of costs may be necessary for server and line construction.

A peer-to-peer (P2P) transfer technology is being required to solve the issues. According to the P2P transfer technology, since data are directly exchanged between terminals, there is no need to upload or download files to or from a server. Also, in the case where P2P transfer technology is used, since a file is not stored in the server, it is free from file leakage through server hacking.

However, since a delay time for P2P connection increases due to influence of various network environments (or conditions), it is difficult to transfer files stably.

SUMMARY

It is important to determine an optimum transfer path upon transferring files by using the P2P manner. In particular, in the case where a client (a transmission client) to send a file and a client (a reception client) to receive the file are within the same region where the clients connect to the same wireless access point, a way to directly connect the transmission client and the reception client through an access point (i.e., a way for an access point to play a role of a node for relaying a file without passing through an external server) may provide the highest transfer speed.

However, a setting state of the access point may have an influence on the way to use the access point as a relay node. In the case where the access point blocks direct connection between terminals (clients), a file transfer cannot be performed through the access point. If a user attempts to send files through an access point blocked by a request of a server while the user does not know whether direct connection between terminals through the access point is blocked, a delay time may become very long, and thus, the complaint of the user may increase.

Accordingly, the inventive concept is directed to provides a system, a method, and a program for a P2P file transfer, which are capable of preventing an unnecessary transfer delay by accumulating information of a blocked access point on the basis of attempts about a file transfer between a transmission client and a reception client through a wireless access point and avoiding the file transfer through the blocked access point later.

According to an aspect of an embodiment, a peer-to-peer (P2P) transfer method includes receiving, at a server, search identification information of a search access point from a transmission client and a reception client, when the transmission client and the reception client search for a first access point as the same search access point or connects to the first access point being the same search access point, setting the first access point to a transfer path, determining whether the first access point is blocked, and matching whether the first access point is blocked with the first identification information and storing whether the first access point is blocked or not, the first identification information and a result of the matching in an accumulation database.

The determining may include recognizing the first access point as being blocked, when a transfer time of a file sent from the transmission client exceeds a reference time, and that the first access point is blocked indicates blocking connection between clients through the first access point.

The determining may include checking the accumulation database to determine whether the first identification information corresponds to identification information matched as being blocked.

The P2P transfer method may further include selecting another transfer path except for a transfer path through the first access point when the search identification information is included in blocked identification information of the accumulation database.

The selecting may include determining, at the server, whether a second access point except for the first access point is identically found at the transmission client and the reception client, and requesting the transmission client to transfer a file to the reception client through the second access point, when the second access point is found. The storing may include matching whether the second access point is blocked with the second identification information and storing whether the second access point is blocked or not, the second identification information and the result of the matching associated with the second access point in the accumulation database.

The P2P transfer method may further include downgrading a priority upon setting a transfer path of the first access point.

The setting may include, when the transmission client and the reception client search for one or more search access points being the same, requesting connection of the transmission client and the reception client from a specific search access point providing a highest transfer speed, based on an upload speed of the transmission client and a download speed of the reception client.

The receiving may include receiving location information, through which the first identification information is recognized, from the transmission client or the reception client together, and matching the first identification information with the location information, wherein the first identification information, the location information and the result of the matching the first identification information with the location information is stored in the accumulation database.

The P2P transfer method may further include, when a wireless communication function through an access point of the transmission client or the reception client is restricted, receiving respective location information recognized by the transmission client and the reception client, determining whether an access point covering a range, in which the respective location information is included, is present in the accumulation database, and activating a wireless communication function through the access point of the transmission client or the reception client when the access point is present.

The P2P transfer method may further include receiving setting data associated with whether to perform a file transfer through the access point from the transmission client or the reception client.

According to another aspect of an embodiment, a program for a P2P transfer is stored in a medium to execute the PEP transfer method in combination with a computer that is a piece of hardware.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, exemplary embodiments of the inventive concept will be described in detail with reference to the accompanying drawings. The above and other aspects, features and advantages of the invention will become apparent from the following description of the following embodiments given in conjunction with the accompanying drawings. However, the inventive concept is not limited to the embodiments disclosed below, but may be implemented in various forms. The embodiments of the inventive concept is provided to make the disclosure of the inventive concept complete and fully inform those skilled in the art to which the inventive concept pertains of the scope of the inventive concept. The same reference numerals denote the same elements throughout the specification.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other elements, in addition to the aforementioned elements.

In the specification, a client refers to all devices including a communication function that may allow users to install and use a program (or an application). That is, the client may include various communication devices such as a cellular phone, a personal communication service (PCS) phone, a mobile terminal of synchronous/asynchronous international mobile telecommunication-2000 (IMT-2000), a palm personal computer (PC), personal digital assistant (PDA), a smartphone, a wireless application protocol (WAP) phone, a mobile game console, a tablet PC, a smart watch, a notebook PC, a desktop PC, a smart camera, and a smart television (TV). Also, the client may include a device that may not basically include a communication function but may perform communication in combination with a memory chip having a communication function. For example, in the case where a digital camera may not basically include a communication function but may perform communication through connection with a memory chip including a communication chip, the digital camera may be included in the client.

In the specification, a relay node means a node that relays a file for a P2P file transfer between a transmission client and a reception client. A specific external server may correspond to the relay node in the case of transferring files between the transmission client and the reception client by using cellular communication or a wireless local area network (WLAN); an access point may correspond to the relay node in the case of directly connecting the transmission client and the reception client through the access point.

In the specification, an access point (AP) means a device that may allow wireless equipment to connect to a network. The access point may include a wireless router that may support wireless communication (WLAN communication). The access point may allow the transmission client and the reception client to perform wireless communication and may allow the transmission client and the reception client to perform a P2P file transfer by using the access point as the relay node. In the specification, a search access point means an access point found by the transmission client and the reception client that may support WLAN communication (or Wi-Fi communication). For example, Wi-Fi APs found as a mobile terminal corresponding to the transmission client and the reception client activates a Wi-Fi communication function may correspond to the search access point.

In the specification, identification information means information that is used to identify an access point. For example, the identification information may include a name, a service set identifier (SSID), basic service set identification (BSSID), etc. of the access point. Also, in the case of measuring location information of a specific access point found by the transmission client or the reception client, identification information of the access point may include the found location information. In the specification, first identification information may correspond to identification information of a first access point, and second identification information may correspond to identification information of a second access point.

Below, a method and a program for transferring files in a P2P manner through an access point, according to embodiments of the inventive concept, will be described with reference to accompanying drawings.

Figure 1:
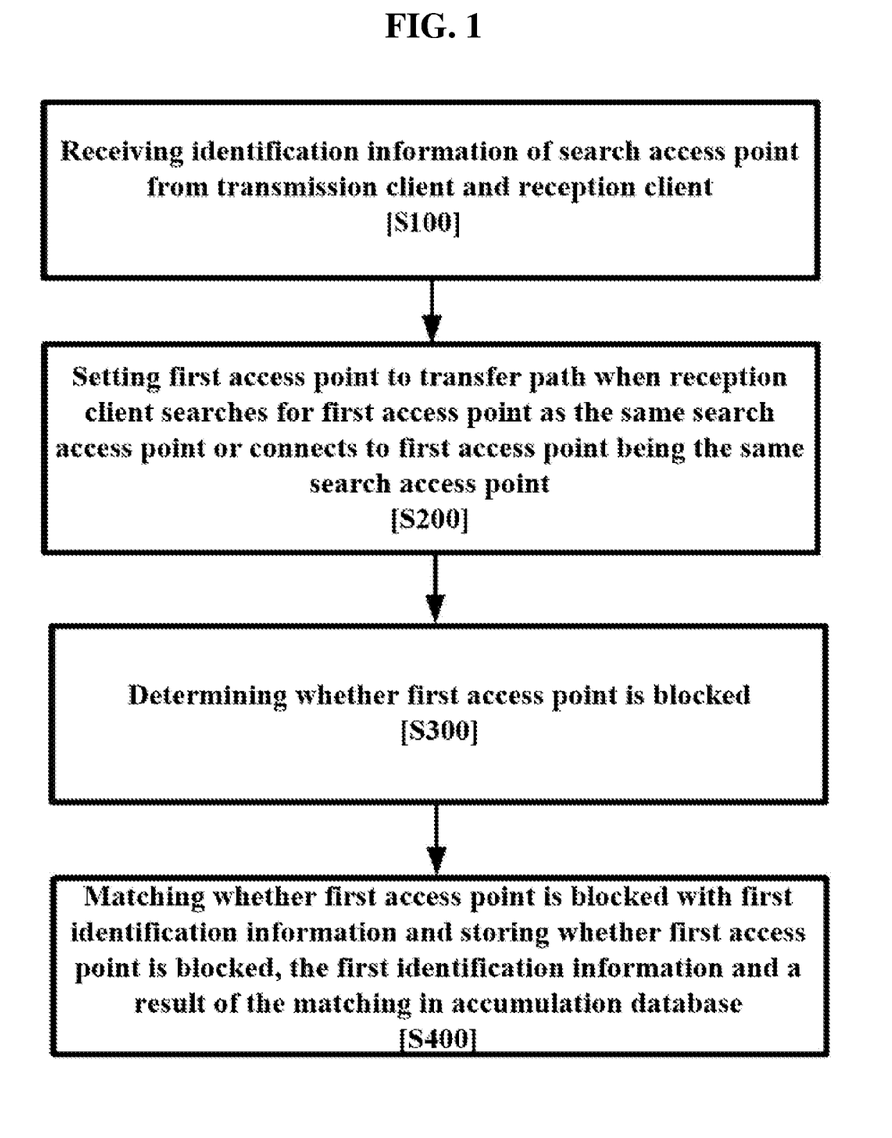
FIG. 1 is a flowchart illustrating a peer-to-peer (P2P) transfer method according to an embodiment of the inventive concept.

FIG. 1 is a flowchart illustrating a method for a P2P transfer through an access point according to an embodiment of the inventive concept.

Referring to FIG. 1, a method for a P2P transfer through an access point according to an embodiment of the inventive concept includes receiving identification information of a search access point 400 from a transmission client 200 and a reception client 300 (S100); in the case where the reception client 300 searches for a first access point 410 as the same search access point 400 or connects to the first access point 410 being the same search access point 400, setting the first access point 410 to a transfer path (S200); determining whether the first access point 410 is blocked (S300); and matching whether the first access point 410 is blocked with the first identification information and storing whether the first access point 410 is blocked, the first identification information and the result of the matching in an accumulation database (S400). The method for a P2P transfer through an access point, according to an embodiment of the inventive concept, will be described below in regular sequence.

Figure 2:
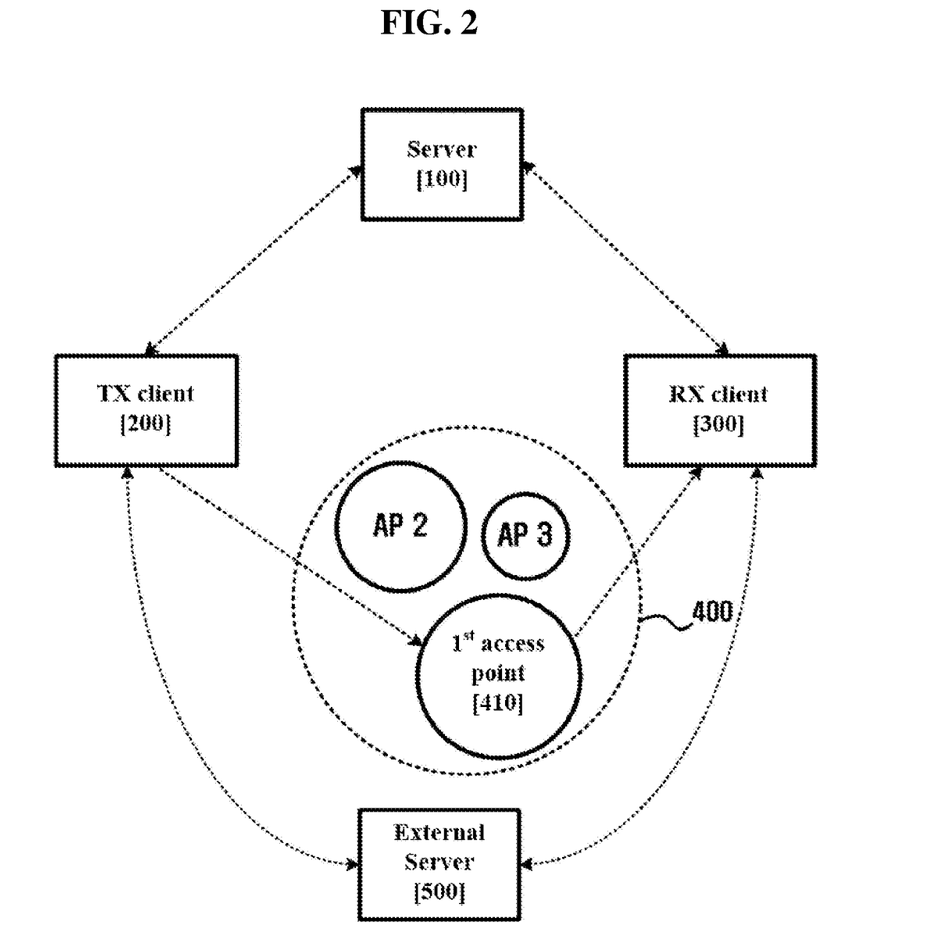
FIG. 2 is a view illustrating connection of a P2P transfer system according to an embodiment of the inventive concept.

The transmission client 200 and the reception client 300 may perform a P2P file transfer through various paths that a server 100 specifies or sets. For example, it may be possible to utilize a way to transfer a file through wireless communication (e.g., cellular communication and WLAN (Wi-Fi) communication) by using an external server 500 as a relay node; it may be possible to utilize a way to transfer a file by using a wireless access point (AP) as a relay node. In various transfer paths, in the case where the transmission client 200 and the reception client 300 connect to the same wireless access point, a physical distance by which data moves through communication may be the shortest, and separate charges for cellular communication may not be incurred.

However, installed access points may include an access point that is set to prevent data from being transferred through the access point as a relay node. If a user attempts to transfer a file to the blocked (or transfer-blocked) access point since the transmission client 200 and the reception client 300 connect to the same access point, a delay time may increase, thereby causing the complaint of the user. There is a need for a way to construct a database based on accumulative information of an access point prevented from being used as a relay node (i.e., prevented from being directly transferred between terminals by using an AP) and to avoid a file transfer through the blocked access point by utilizing the database. Accordingly, the server 100 may obtain and accumulate information of a blocked access point by utilizing a result of attempting to transfer a file through a specific access point by the transmission client 200 and the reception client 300.

First, the server 100 receives search identification information of the search access point 400 from the transmission client 200 and the reception client 300 (S100). That is, the transmission client 200 and the reception client 300 that correspond to a mobile terminal may receive information (e.g., a name, an SSID, and a BSSID of an AP) for identifying a found access point (e.g., Wi-Fi AP).

In an embodiment, the server 100 may receive, through wireless communication, identification information of an access point to which the transmission client 200 and the reception client 300 currently connects and through which the transmission client 200 and the reception client 300 are connected to each other. That is, to determine whether to instantly perform a file transfer through an access point in a current connection state, the server 100 may obtain only identification information of a currently connected access point.

Also, in another embodiment, the transmission client 200 and the reception client 300 may search for one or more surrounding access points, and the server 100 may select an access point, which is the most appropriate to a file transfer, from among the one or more access points (i.e., the search access point 400) found by the transmission client 200 and the reception client 300. For example, to select a transfer path, which provides the highest transfer speed, of the search access point 400 that the transmission client 200 and the reception client 300 search for in common, the server 100 may obtain information about an upload speed of the transmission client 200 and a download speed of the reception client 300 and may request connection between the transmission client 200 and the reception client 300 from the specific search access point 400 providing the highest transfer speed. That is, the server 100 may receive an upload or download speed, which each access point provides, from an access point of each of the transmission client 200 and the reception client 300 together with identification information and may determine, as a relay node, an access point, which may provide an optimum transfer speed, from among access points being present within a region where the transmission client 200 and the reception client 300 are located.

The server 100 may create an accumulation database by storing search identification information of the search access point 400 received from the transmission client 200 or the reception client 300. The server 100 may create a wireless access point list through the transmission client 200 and the reception client 300 performing a file transfer. For example, in the case where the transmission client 200 or the reception client 300, in which a P2P file transfer program according to an embodiment of the inventive concept is installed, attempts to connect to a wireless access point (e.g., the case may include the case of using a P2P file transfer application for a P2P file transfer and the case of generally attempting to connect to a WLAN), the server 100 may receive identification information of a wireless access point from the transmission client 200 or the reception client 300 and may continuously store the received information in the accumulation database.

Also, the server 100 may together receive search identification information of the search access point 400 and search location information, through which the search access point 400 is found, from the transmission client 200 or the reception client 300 and may store the received information in the accumulation database. That is, the server 100 may store a result of matching the search location information with the search location information in the accumulation database.

Since access points may include access points having the same identification information (i.e., since the same identification information is included in access points manufactured by a specific maker), it may be impossible to distinguish from all access points only by using identification information of access points. Accordingly, the server 100 may together receive search location information upon receiving search identification information from the transmission client 200 or the reception client 300. As such, the server 100 may form a map associated with wireless access points, and access points including the same identification information may be distinguishable through location information.

Also, as will be described later, identification information and search location information stored in the accumulation database may be used to determine whether to activate a communication function through a wireless access point of the transmission client 200 or the reception client 300. Since the transmission client 200 or the reception client 300 may not activate a communication function through a wireless access point, if a result of comparing accumulated search location information with a current location where the transmission client 200 or the reception client 300 is located indicates a location where a file transfer through wireless communication is made at the highest transfer speed, the server 100 may request the transmission client 200 or the reception client 300 to activate a communication function (e.g., a Wi-Fi communication function) using a wireless access point. As such, a user of the transmission client 200 or the reception client 300 may transfer a file at an optimum transfer speed, and cellular data may be prevented from being unnecessarily used at a site where a wireless access point is supported free.

In the case where the transmission client 200 and the reception client 300 searches for the first access point 410 as the same search access point 400 or connects to the first access point 410 being the same search access point 400, the server 100 sets the first access point 410 to a transfer path (S200). First, the server 100 may compare search identification information received from the transmission client 200 and the reception client 300 to search for the same search access point 400 or to determine whether to connect to the same search access point 400. For example, in the case where the server 100 receives only identification information of a connected access point from the transmission client 200 or the reception client 300, the server 100 may determine whether to connect to the same search access point 400 by comparing only search identification information of the search access point 400 to which the transmission client 200 and the reception client 300 connect. Also, for example, in the case where the server 100 receives identification information of all access points found by the transmission client 200 or the reception client 300, the server 100 may determine whether the same search access point 400 exists, by mutually comparing pieces of search identification information of the search access point 400 found by the transmission client 200 and the reception client 300.

Afterwards, in the case where the first access point 410 being the same search access point 400 is found in common by the transmission client 200 and the reception client 300 or is connected thereto, the server 100 may determine the first access point 410 as a relay node and may set the first access point 410 to a transfer path between the transmission client 200 and the reception client 300.

Also, the server 100 may compare search location information together in the process of comparing pieces of search identification information received from the transmission client 200 and the reception client 300. In the case where different access points include the same identification information (i.e., in the case where access points are at different sites but include the same identification information), even though the transmission client 200 and the reception client 300 search for (connect to) different access points that are substantially spaced apart from each other, different access points may be abnormally recognized as the same access points due to the same identification information. Accordingly, the server 100 may prevent access points, which are at different sites and have the same identification information, from being recognized as the first access point 410, by comparing search identification information of the search access point 400 and search location information of the search access point 400 together.

The server 100 determines whether the first access point 410 is blocked (S300). The blocking means a setting for blocking connection between clients through an access point. That is, the server 100 may attempt to transfer a file from the transmission client 200 to the reception client 300 through a transfer path using the first access point 410 and may recognize whether the first access point 410 is blocked, by checking whether the file transfer is normally performed.

As an embodiment of recognizing whether the first access point 410 is blocked, if a transfer time of a file sent from the transmission client 200 exceeds a reference time, the server 100 may determine that the first access point 410 is blocked. If the first access point 410 is blocked, since a file transfer from the transmission client 200 is delayed, the file transfer may not be completed even though a time elapses. Accordingly, the server 100 may set a reference time for determining whether an access point is blocked and may determine that the access point is blocked, if a transfer progress time exceeds the reference time. For example, if a time that is expected based on the size of a file transfer-requested by the transmission client 200 and a communication speed of the first access point 410 (i.e., an upload speed of the transmission client 200 and a download speed of the reception client 300) elapses by a given ratio or higher, the server 100 may determine the first access point 410 as a blocked access point.

Afterwards, the server 100 may match the first identification information with whether the first access point 410 is blocked and may store whether the first access point 410 is blocked, the first identification information and the result of the matching in the accumulation database (S400). That is, to prevent the blocked first access point 410 from be setting to a relay node upon transferring a file in a P2P manner, the server 100 may match information of the recognized blocked access point with first identification information and may store a result of the matching in the accumulation database.

Also, the method may further include downgrading a priority upon setting a transfer path of the first access point. For example, the server 100 may classify one or more access points recognized at the same site as a group, and priorities of access points in the group may be determined.

Also, the method may further include determining, in advance, whether an access point of the first identification information is blocked in the accumulation database. That is, in the case where the transmission client 200 and the reception client 300 connects to the same first access point 410, the server 100 may in advance determine whether an access point is blocked, by checking a matching relationship between identification information and blocking information previously constructed in the accumulation database, before the server 100 performs a file transfer (i.e., after receiving the search identification information and before setting the transfer path). As such, in the case where the first access point 410 is an access point that is determined as being blocked in the accumulation database, the server 100 may not attempt to transfer a file through the first access point 410, thus preventing a file transfer from being delayed.

Also, the method may further include selecting another transfer path except for the transfer path through the search access point 400, if a first identification number corresponds to a blocked access point of the accumulation database. For example, in the case where only a blocked access point exists as a wireless access point, the server 100 may request the transmission client 200 and the reception client 300 to transfer a file by using the external server 500 as a relay node.

Also, as another embodiment of selecting the another transfer path, the server 100 may search for another access point (i.e., a second access point) connected in common to the transmission client 200 and the reception client 300 and may request the transmission client 200 and the reception client 300 to perform a file transfer by using the second access point as a relay node. To this end, the method may include determining whether the same second access point except for the first access point is found with regard to the transmission client 200 and the reception client 300; and requesting the transmission client 200 to transfer a file to the reception client 300 through the second access point, if the second access point is found.

As such, in the case where the first access point 410 corresponds to a recently installed access point, and thus, information about whether the first access point 410 is blocked is not stored in the accumulation database, the server 100 may allow a file transfer to be performed between the transmission client 200 and the reception client 300 through the first access point 410, may determine whether the first access point 410 is blocked, and may continuously update the accumulation database. Also, since a file transfer may be previously possible through an access point but the access point may be blocked due to a change in settings of the access point, the server 100 may allow the transmission client 200 and the reception client 300 to transfer a file through the first access point 410 and may continuously check whether the first access point 410 is blocked due to a change in settings.

Also, the method may further include receiving respective location information recognized by the transmission client 200 and the reception client 300; determining whether an access point covering a range in which the respective location information is included is present in the accumulation database; and activating a wireless communication function through an access point of the transmission client 200 or the reception client 300, if the access point is present. In the case where a wireless communication function through an access point of the transmission client 200 or the reception client 300 is restricted, if a WLAN AP that may perform a role of a relay node of a file transfer is present in a region where the transmission client 200 and the reception client 300 are located, the server 100 may request activation of a WLAN communication function from the transmission client 200 or the reception client 300 in which a wireless communication function through an access point is restricted. As such, in the case where a file transfer path through the WLAN AP is an optimum transfer path, the server 100 may request the transmission client 200 and the reception client 300 to transfer a file through the optimum transfer path regardless of states of the transmission client 200 and the reception client 300.

Also, on the basis of location information matched with identification information of the AP in the accumulation database, the server 100 may request the transmission client 200 and the reception client 300 to connect in common to an access point not blocked and to perform a file transfer through the access point. As such, a user of the transmission client 200 or the reception client 300 may transfer a file through the optimum transfer path using the WLAN AP determined or selected by the server 100 without a separate operation for selecting an optimum path.

Also, the method may further include receiving setting data associated with whether to perform a file transfer through the access point from the transmission client 200 or the reception client 300. For example, the user of the transmission client 200 or the reception client 300 may prefer to a transfer path where a communication speed is maintained uniformly and probability of hacking is low. Accordingly, the server 100 may receive setting data associated with a file transfer manner stored in a P2P file transfer program according to an embodiment of the inventive concept from the transmission client 200 or the reception client 300; in the case where any one of the transmission client 200 or the reception client 300 is set to limit wireless communication through an access point, the server 100 may request the transmission client 200 and the reception client 300 to transfer a file by using another path except for a file transfer path through an access point.

The security-enhanced P2P transfer method according to an embodiment of the inventive concept may be implemented by a program (or an application) and may be stored in a medium such that the program is executed in combination with a computer being hardware.

For the computer to read the program and to execute the method implemented by the program, the program may include a code that is coded in a computer language, which a processor (e.g., a central processing unit CPU) of the computer may read through a device interface of the computer, such as C, C++, JAVA, or a machine language. The code may include a functional code related to a function that defines necessary functions that execute the method, and the functions may include an execution procedure related control code necessary for the processor of the computer to execute the functions in its procedures. Further, the code may further include additional information that is necessary for the processor of the computer to execute the functions or a memory reference related code on which location (address) of an internal or external memory of the computer should be referenced by the media. Further, when the processor of the computer is required to perform communication with another computer or the server 100 in a remote site to allow the processor of the computer to execute the functions, the code may further include a communication related code on how the processor of the computer executes communication with another computer or the server 100 or which information or medium should be transmitted and received during communication by using a communication module of the computer.

The stored medium refers not to a medium, such as a register, a cache, or a memory, which stores data for a short time but to a medium that stores data semi-permanently and is read by a device. In detail, for example, the stored medium may include a read only memory (ROM), a random access memory (RAM), a CD-ROM, a magnetic tape, a floppy disk, and an optical data storage device, but the inventive concept is not limited thereto. That is, the program may be stored in various recording media on various servers (e.g., 100 of FIG. 2), which the computer may access, or in various recording media on the computer of the user. Further, the media may be dispersed in a computer system connected to the medium through a network, and codes that may be read by the computer in a dispersion manner may be stored.

The inventive concept has the following effects.

First, it may be possible to prevent a file transfer from being unnecessarily delayed due to attempting to transfer a file through an access point inhibited from being used as a relay node for a direct transfer between clients upon transferring a file in a P2P manner.

Second, it may be possible to accumulate identification information of an access point and blocking information of the access point on the basis of an attempt on a file transfer by a transmission client and a reception client. That is, a server may automatically accumulate information about a blocked access point and may continuously update a database.

Third, it may be possible to automatically decide an access point, which provides an optimum transfer path, based on location information of the transmission client and the reception client, and a WLAN communication function of the transmission client or the reception client may perform activation for the purpose of transferring a file by using an access point as a relay node. As such, a user does not need to perform a separate operation for the purpose of transfer a file through an optimum transfer path.

Although the exemplary embodiments of the inventive concept have been described with reference to the accompanying drawings, it will be understood by those skilled in the art to which the inventive concept pertains that the inventive concept can be carried out in other detailed forms without changing the technical spirits and essential features thereof. Therefore, the above-described embodiments are exemplary in all aspects, and should be construed not to be restrictive.

What is claimed is:

1. A peer-to-peer (P2P) transfer method comprising:
   receiving, at a server, first identification information of a search access point from a transmission client and a reception client;
   in response to the transmission client and the reception client searching for a first access point as the same search access point or connects to the first access point being the same search access point, setting the first access point to a transfer path;
   determining whether the first access point is blocked; and
   matching whether the first access point is blocked with the first identification information and storing whether the first access point is blocked or not, the first identification information and a result of the matching in an accumulation database,
   wherein the setting includes:
   in response to the transmission client and the reception client searching for one or more search access points being the same, requesting connection of the transmission client and the reception client from a specific search access point providing a highest transfer speed, based on an upload speed of the transmission client and a download speed of the reception client.

2. The P2P transfer method of claim 1, wherein the determining includes:
   recognizing the first access point as being blocked, in response to a transfer time of a file sent from the transmission client exceeds a reference time, and
   wherein that the first access point is blocked indicates blocking connection between clients through the first access point.

3. The P2P transfer method of claim 1, wherein the determining includes:
   checking the accumulation database to determine whether the first identification information corresponds to identification information matched as being blocked.

4. The P2P transfer method of claim 3, further comprising:
   selecting another transfer path except for a transfer path through the first access point in response to the first identification information corresponding to identification information matched as being blocked and stored in the accumulation database.

5. A peer-to-peer (P2P) transfer method comprising:
   receiving, at a server, first identification information of a search access point from a transmission client and a reception client;
   in response to the transmission client and the reception client searching for a first access point as the same search access point or connects to the first access point being the same search access point, setting the first access point to a transfer path;
   determining whether the first access point is blocked by checking an accumulation database to determine whether the first identification information corresponds to identification information matched as being blocked;
   matching whether the first access point is blocked with the first identification information and storing whether the first access point is blocked or not, the first identification information and a result of the matching in the accumulation database;
   selecting another transfer path except for a transfer path through the first access point in response to the first identification information corresponding to identification information matched as being blocked and stored in the accumulation database,
   wherein the selecting includes:
   determining, at the server, whether a second access point except for the first access point is identically found at the transmission client and the reception client; and
   requesting the transmission client to transfer a file to the reception client through the second access point, in response to the second access point being found, and
   wherein the storing includes:
   matching whether the second access point is blocked with second identification information and storing whether the second access point is blocked or not, the second identification information and a result of the matching associated with the second access point in the accumulation database.

6. The P2P transfer method of claim 1, further comprising:
   downgrading a priority upon setting a transfer path of the first access point.

7. The P2P transfer method of claim 1, wherein the receiving includes:
   receiving location information, through which the first identification information is recognized, from the transmission client or the reception client together; and
   matching the first identification information with the location information, wherein the first identification information, the location information and the result of the matching the first identification information with the location information is stored in the accumulation database.

8. A peer-to-peer (P2P) transfer method comprising:
   receiving, at a server, first identification information of a search access point from a transmission client and a reception client;
   in response to the transmission client and the reception client searching for a first access point as the same search access point or connects to the first access point being the same search access point, setting the first access point to a transfer path;
   determining whether the first access point is blocked;
   matching whether the first access point is blocked with the first identification information and storing whether the first access point is blocked or not, the first identification information and a result of the matching in an accumulation database;
   in response to a wireless communication function through an access point of the transmission client or the reception client being restricted, receiving respective location information recognized by the transmission client and the reception client, determining whether an access point covering a range, in which the respective location information is included, is present in the accumulation database, and activating the wireless communication function through the access point of the transmission client or the reception client in response to the access point being present.

9. The P2P transfer method of claim 1, further comprising: receiving setting data associated with whether to perform a file transfer through the access point from the transmission client or the reception client.

10. A non-transitory computer-readable recording medium storing a program for a P2P transfer, and configured to be coupled to a computer being hardware, the program includes instructions to execute the method of claim 1.

* * * * *